(12) United States Patent
Iwakawa

(10) Patent No.: US 8,144,397 B2
(45) Date of Patent: Mar. 27, 2012

(54) LAMINATED SHEET AND DISPLAY SCREEN

(75) Inventor: Ryuuichi Iwakawa, Tainai (JP)

(73) Assignee: KURARAY Co., Ltd., Kurashiki-shi (JP)

( * ) Notice: Subject to any disclaimer, the term of this patent is extended or adjusted under 35 U.S.C. 154(b) by 431 days.

(21) Appl. No.: 12/307,491

(22) PCT Filed: Jun. 29, 2007

(86) PCT No.: PCT/JP2007/063097
§ 371 (c)(1),
(2), (4) Date: Jan. 5, 2009

(87) PCT Pub. No.: WO2008/004500
PCT Pub. Date: Jan. 10, 2008

(65) Prior Publication Data
US 2009/0251774 A1    Oct. 8, 2009

(30) Foreign Application Priority Data
Jul. 7, 2006   (JP) .................................. 2006-188638

(51) Int. Cl.
*G02B 3/00* (2006.01)
(52) U.S. Cl. ......... 359/457; 359/443; 359/451; 359/455
(58) Field of Classification Search .................... 216/26; 359/443, 451, 455, 457
See application file for complete search history.

(56) References Cited

U.S. PATENT DOCUMENTS

| 6,088,158 A | 7/2000 | Kimura |
| 2004/0211753 A1 | 10/2004 | Shimizu et al. |
| 2005/0044115 A1 | 2/2005 | Iwakawa et al. |

FOREIGN PATENT DOCUMENTS

| EP | 1 072 944 A1 | 1/2001 |
| JP | 2 72341 | 3/1990 |
| JP | 4 67134 | 3/1992 |
| JP | 11 72848 | 3/1999 |
| JP | 2000 214533 | 8/2000 |
| JP | 2002 40563 | 2/2002 |
| JP | 2004-133154 | 4/2004 |
| JP | 2004 184482 | 7/2004 |
| JP | 2005 49846 | 2/2005 |
| JP | 2006 208930 | 8/2006 |
| JP | 2007 109608 | 4/2007 |

*Primary Examiner* — Clayton E LaBalle
*Assistant Examiner* — Kevin Butler
(74) *Attorney, Agent, or Firm* — Oblon, Spivak, McClelland, Maier & Neustadt, L.L.P.

(57) ABSTRACT

A laminated sheet for a display screen. The laminated sheet includes a multilayer sheet A including two or more layers with different linear expansion coefficients. The laminated sheet further includes a single sheet B which is a sheet other than the multilayer sheet A. When all sheets are stacked, a viewing-side sheet is convex on an image light source side, and an image light source-side sheet is convex on the viewing side, or the viewing-side sheet and the image light source side-sheet are both convex on the image light source side, and a curvature of the viewing-side sheet is greater than a curvature of the image light source-side sheet.

5 Claims, 11 Drawing Sheets

INCIDENCE-SIDE SHEET    EMISSION-SIDE SHEET

|  |  | EMBODIMENT 1 | | EMBODIMENT 2 | | EMBODIMENT 3 | | EMBODIMENT 4 | |
|---|---|---|---|---|---|---|---|---|---|
|  |  | SHEET A | SHEET B | SHEET A | SHEET B | SHEET A | SHEET B | SHEET A | SHEET B |
|  | FIRST LAYER CONSTITUENT MATERIAL | FRONT PLATE MS WITH RUBBER | 2P LENS LAYER | FRONT PLATE MS | 2P LENS LAYER | FRONT PLATE MS | F BASE PLATE MS | FRONT PLATE MS | F BASE PLATE MS |
|  | SECOND LAYER CONSTITUENT MATERIAL | LENTICULAR MS WITH RUBBER | F BASE PLATE MS | LENTICULAR MS WITH RUBBER | F BASE PLATE MS | LENTICULAR PET (2P LENS LAYER: NEGLECTED) | 2P LAYER | LENTICULAR MS WITH RUBBER | BACKING PET (2P LENS LAYER: NEGLECTED) |
| FIRST LAYER PHYSICAL PROPERTIES | ELASTICITY (MPa) | 2200 | 1500 | 3000 | 1500 | 3000 | 3000 | 3000 | 3000 |
|  | SHEET THICKNESS (mm) | 1.850 | 0.125 | 0.800 | 0.125 | 1.850 | 3.208 | 1.850 | 1.650 |
|  | LINEAR EXPANSION (1/°C) | 7.7E-05 | 8.3E-05 | 6.4E-05 | 8.3E-05 | 6.4E-05 | 6.4E-05 | 6.4E-05 | 6.4E-05 |
|  | FREE ELONGATION (-) | 0.04% | 0.04% | 0.03% | 0.04% | 0.03% | 0.03% | 0.03% | 0.03% |
|  | INITIAL STRAIN (%) | 0.00% | 0.00% | 0.00% | 0.00% | 0.00% | 0.00% | 0.00% | 0.00% |
|  | LAMINATION TEMPERATURE (°C) | 25 | 25 | 25 | 25 | 25 | 25 | 25 | 25 |
| SECOND LAYER PHYSICAL PROPERTIES | ELASTICITY (MPa) | 1750 | 3000 | 1750 | 3000 | 3700 | 2000 | 1750 | 3700 |
|  | SHEET THICKNESS (mm) | 0.150 | 0.800 | 0.200 | 1.850 | 0.100 | 0.250 | 0.400 | 0.188 |
|  | LINEAR EXPANSION (1/°C) | 8.4E-05 | 6.4E-05 | 8.4E-05 | 6.4E-05 | 2.4E-05 | 8.0E-05 | 9.1E-05 | 2.4E-05 |
|  | FREE ELONGATION (-) | 0.04% | 0.03% | 0.04% | 0.03% | 0.01% | 0.04% | 0.05% | 0.01% |
|  | INITIAL STRAIN (%) | 0.00% | 0.00% | 0.00% | 0.00% | 0.00% | 0.00% | 0.00% | 0.00% |
|  | LAMINATION TEMPERATURE (°C) | 25 | 25 | 25 | 25 | 25 | 25 | 25 | 25 |
| TOTAL THICKNESS, SIZE | WORKPIECE SIZE (WIDTH, INCHES) | 52 | 52 | 52 | 52 | 52 | 52 | 52 | 52 |
|  | LONG-EDGE LENGTH (mm) | 1151 | 1151 | 1151 | 1151 | 1151 | 1151 | 1151 | 1151 |
|  | SHORT-EDGE LENGTH (mm) | 648 | 648 | 648 | 648 | 648 | 648 | 648 | 648 |
|  | TOTAL THICKNESS H (mm) | 2.000 | 0.925 | 1.000 | 1.975 | 1.950 | 3.458 | 2.250 | 1.838 |

Fig. 8

SHORT-EDGE WARPING OF SINGLE PIECE (mm)

| TEMPERATURE (°C) | EMBODIMENT 1 | | EMBODIMENT 2 | | EMBODIMENT 3 | | EMBODIMENT 4 | |
|---|---|---|---|---|---|---|---|---|
| | SHEET A | SHEET B | SHEET A | SHEET B | SHEET A | SHEET B | SHEET A | SHEET B |
| -10 | 0.0 | 0.0 | 0.0 | 0.0 | 22.2 | -4.3 | 0.0 | 0.0 |
| -5 | 0.3 | -2.4 | 3.9 | -0.5 | 20.4 | -3.9 | 2.1 | -3.6 |
| 0 | 0.6 | -4.8 | 7.8 | -1.0 | 18.5 | -3.6 | 4.2 | -7.2 |
| 5 | 1.0 | -7.3 | 11.7 | -1.5 | 16.7 | -3.2 | 6.2 | -10.7 |
| 10 | 1.3 | -9.7 | 15.6 | -2.0 | 14.8 | -2.8 | 8.3 | -14.3 |
| 15 | 1.6 | -12.1 | 19.5 | -2.5 | 13.0 | -2.5 | 10.4 | -17.9 |
| 20 | 1.9 | -14.5 | 23.4 | -3.0 | 11.1 | -2.1 | 12.5 | -21.5 |
| 25 | 2.2 | -16.9 | 27.3 | -3.5 | 9.3 | -1.8 | 14.6 | -25.1 |
| 30 | 2.6 | -19.4 | 31.2 | -4.1 | 7.4 | -1.4 | 16.6 | -28.7 |
| 35 | 2.9 | -21.8 | 35.1 | -4.6 | 5.6 | -1.1 | 18.7 | -32.2 |
| 40 | 3.2 | -24.2 | 38.9 | -5.1 | 3.7 | -0.7 | 20.8 | -35.8 |
| 45 | 3.5 | -26.6 | 42.8 | -5.6 | 1.9 | -0.4 | 22.9 | -39.4 |
| 50 | 3.9 | -29.0 | 46.7 | -6.1 | 0.0 | 0.0 | 25.0 | -43.0 |

Fig. 9A

COMBINED WARPING (mm): $\delta_{AB} = (E_A t_A^3 \delta_A + E_B t_B^3 \delta_B)/(E_A t_A^3 + E_B t_B^3)$

| TEMPERATURE (°C) | EMBODIMENT 1 | EMBODIMENT 2 | EMBODIMENT 3 | EMBODIMENT 4 |
|---|---|---|---|---|
| -10 | 0.00000 | 0.00000 | 0.00000 | 0.00000 |
| -5 | -0.00431 | -0.00244 | -0.00017 | -0.00231 |
| 0 | -0.00862 | -0.00489 | -0.00033 | -0.00462 |
| 5 | -0.01293 | -0.00733 | -0.00050 | -0.00693 |
| 10 | -0.01724 | -0.00977 | -0.00066 | -0.00924 |
| 15 | -0.02156 | -0.01221 | -0.00083 | -0.01155 |
| 20 | -0.02587 | -0.01466 | -0.00100 | -0.01385 |
| 25 | -0.03018 | -0.01710 | -0.00116 | -0.01616 |
| 30 | -0.03449 | -0.01954 | -0.00133 | -0.01847 |
| 35 | -0.03880 | -0.02198 | -0.00149 | -0.02078 |
| 40 | -0.04311 | -0.02443 | -0.00166 | -0.02309 |
| 45 | -0.04742 | -0.02687 | -0.00183 | -0.02540 |
| 50 | -0.05173 | -0.02931 | -0.00199 | -0.02771 |

Fig. 9B

|  |  | EMBODIMENT 5 | | EMBODIMENT 6 | | EMBODIMENT 7 | | |
|---|---|---|---|---|---|---|---|---|
|  |  | SHEET A PRISM SHEET | SHEET B DIFFUSER PLATE | SHEET A PRISM SHEET | SHEET B LENS SHEET | SHEET A PRISM SHEET | SHEET B LENS SHEET | SHEET C DIFFUSER PLATE |
|  | FIRST LAYER CONSTITUENT MATERIAL | EMISSION FACE 2P PRISM LAYER | EMISSION FACE 2P LENS LAYER | EMISSION FACE 2P PRISM LAYER | PET BASE MATERIAL | PET BASE MATERIAL | PET BASE MATERIAL | EMISSION FACE 2P LENS LAYER |
|  | SECOND LAYER CONSTITUENT MATERIAL | PET BASE MATERIAL | MS BASE MATERIAL | PET BASE MATERIAL | INCIDENCE FACE 2P LENS LAYER | EMISSION FACE 2P PRISM LAYER | EMISSION FACE 2P PRISM LAYER | MS BASE MATERIAL |
| FIRST LAYER PHYSICAL PROPERTIES | ELASTICITY (MPA) | 3000 | 3300 | 3000 | 3700 | 3700 | 3700 | 2000 |
|  | SHEET THICKNESS (mm) | 0.100 | 0.180 | 0.050 | 0.188 | 0.350 | 0.350 | 0.200 |
|  | LINEAR EXPANSION (1/°C) | 8.0E-05 | 6.0E-05 | 8.0E-05 | 2.5E-05 | 2.5E-05 | 2.5E-05 | 8.0E-05 |
|  | FREE ELONGATION (-) | 0.04% | 0.03% | 0.04% | 0.01% | 0.01% | 0.01% | 0.04% |
|  | INITIAL STRAIN (%) | 0.00% | 0.00% | 0.00% | 0.00% | 0.00% | 0.00% | 0.00% |
|  | LAMINATION TEMPERATURE (°C) | 25 | 25 | 25 | 25 | 25 | 25 | 25 |
| SECOND LAYER PHYSICAL PROPERTIES | ELASTICITY (MPA) | 3700 | 3000 | 3700 | 2000 | 2000 | 3000 | 3000 |
|  | SHEET THICKNESS (mm) | 0.250 | 1.820 | 0.250 | 0.050 | 0.120 | 0.040 | 1.200 |
|  | LINEAR EXPANSION (1/°C) | 2.5E-05 | 6.4E-05 | 2.5E-05 | 1.3E-04 | 9.0E-05 | 7.0E-05 | 6.4E-05 |
|  | FREE ELONGATION (-) | 0.01% | 0.03% | 0.01% | 0.06% | 0.05% | 0.04% | 0.03% |
|  | INITIAL STRAIN (%) | 0.00% | 0.00% | 0.00% | 0.00% | 0.00% | 0.00% | 0.00% |
|  | LAMINATION TEMPERATURE (°C) | 25 | 25 | 25 | 25 | 25 | 25 | 25 |
| TOTAL THICKNESS, SIZE | WORKPIECE SIZE (WIDTH, INCHES) | 52 | 52 | 52 | 52 | 52 | 52 | 52 |
|  | LONG-EDGE LENGTH (mm) | 1151 | 1151 | 1151 | 1151 | 1151 | 1151 | 1151 |
|  | SHORT-EDGE LENGTH (mm) | 648 | 648 | 648 | 648 | 648 | 648 | 648 |
|  | TOTAL THICKNESS H (mm) | 2.00 | 0.35 | 0.238 | 0.300 | 0.47 | 0.39 | 1.40 |

| TEMPERATURE (°C) | EMBODIMENT 5 | | EMBODIMENT 6 | | EMBODIMENT 7 | | |
|---|---|---|---|---|---|---|---|
| | SHEET A | SHEET B | SHEET A | SHEET B | SHEET A | SHEET B | SHEET C |
| -10 | 571 | -3.3 | 432 | -989 | 394 | 174 | -20.8 |
| -5 | 524 | -3.0 | 396 | -907 | 361 | 160 | -19.1 |
| 0 | 476 | -2.7 | 360 | -824 | 328 | 145 | -17.3 |
| 5 | 428 | -2.5 | 324 | -742 | 295 | 131 | -15.6 |
| 10 | 381 | -2.2 | 288 | -659 | 263 | 116 | -13.9 |
| 15 | 333 | -1.9 | 252 | -577 | 230 | 102 | -12.1 |
| 20 | 286 | -1.6 | 216 | -495 | 197 | 87 | -10.4 |
| 25 | 238 | -1.4 | 180 | -412 | 164 | 73 | -8.7 |
| 30 | 190 | -1.1 | 144 | -330 | 131 | 58 | -6.9 |
| 35 | 143 | -0.8 | 108 | -247 | 98 | 44 | -5.2 |
| 40 | 95 | -0.5 | 72 | -165 | 66 | 29 | -3.5 |
| 45 | 48 | -0.3 | 36 | -82 | 33 | 15 | -1.7 |
| 50 | 0 | 0.0 | 0 | 0 | 0 | 0 | 0.0 |

| TEMPERATURE (°C) | EMBODIMENT 5 | EMBODIMENT 6 | EMBODIMENT 7 |
|---|---|---|---|
| -10 | 0.00000 | 14.32228 | -0.43466 |
| -5 | 0.00206 | 13.12876 | -0.39844 |
| 0 | 0.00412 | 11.93523 | -0.36221 |
| 5 | 0.00619 | 10.74171 | -0.32599 |
| 10 | 0.00825 | 9.54819 | -0.28977 |
| 15 | 0.01031 | 8.35466 | -0.25355 |
| 20 | 0.01237 | 7.16114 | -0.21733 |
| 25 | 0.01443 | 5.96762 | -0.18111 |
| 30 | 0.01649 | 4.77409 | -0.14489 |
| 35 | 0.01856 | 3.58057 | -0.10866 |
| 40 | 0.02062 | 2.38705 | -0.07244 |
| 45 | 0.02268 | 1.19352 | -0.03622 |
| 50 | 0.02474 | 0.00000 | 0.00000 |

Fig. 11B

LAMINATED SHEET AND DISPLAY SCREEN

TECHNICAL FIELD

The present invention relates to a laminated sheet and a display screen using such a laminated sheet, and in particular relates to a laminated sheet and display screen used in a display apparatus, such as a rear-projection type display apparatus.

BACKGROUND ART

From past to now, rear-projection type projection television sets have been known which enlarged the image light from an image projection device and projected the light onto a screen from the rear, to enable viewing of the image. As the image projection device, a CRT type device can be used, and in recent years liquid crystal displays (LCDs), digital micromirror devices (DMDs), and other micro-displays have also been used.

A rear-projection type screen has a configuration in which two sheets, which are a fresnel lens and a lenticular lens sheet, are stacked and combined. Further, a front sheet may be provided on the viewing side as well. If a gap exists between these two lens sheets, the image may be defocused, or other problems may occur, and so it is required to pile the two sheets in close contact without such gaps. Further, if the stacked lens sheets are not planar overall, there is the problem that warping of the image or other problems occur, and so an overall planar shape must be maintained. Also, in a lens sheet for use in the screen, even the sheet need not be rigorously planar, but may be somewhat convex on the light source side. This is because even if the stacked lens sheets are convex on the viewing side, upon pressing the screen with a finger, the screen is depressed, but when pressing a depression, the depression remains without changing.

Thus, technology is sought to bring the stacked lens sheets into close contact, and to retain an overall planar shape for the two lens sheets, or a somewhat convex shape on the light source side. For example, Japanese Patent Laid-open No. 4-67134 discloses a method in which a fresnel sheet is bowed in advance to be convex on the emission-face side and a lenticular sheet is bowed in advance to be concave on the incidence-face side, and the two are combined and placed in close contact. And, Japanese Patent Laid-open No. 2-072341 discloses a method in which three sheets are all formed in a convex bowed shape in the same direction, and are stacked and placed in close contact.

In general in a rear-projection type screen, multilayer sheets formed by coextrusion molding and lamination are used. In such multilayer sheets, there is the problem that bimetal warping occurs due to differences in the linear expansion rates between layers or due to differences in moisture absorption rates between layers. To address such problems, in Japanese Patent Laid-open No. 11-072848, a method is proposed in which a multilayer sheet is used having a structure such that absorptivity is smaller on the viewing side than on the image side, so that upon moisture absorption, warping toward the image side occurs.

In Japanese Patent Laid-open No. 11-072848, an absorptivity difference of 0.1% or greater is preferable, and no problems are thought to occur no matter how great the difference. Here, in actuality there is the problem that, if the difference is too great, extreme warping occurs. Further, as examples of materials having preferred absorptivities, "acrylics, polycarbonates, styrenes" and similar are disclosed; but there is no mention of the Young's modulus, coefficient of extension, or layer thicknesses, which are important in relation to warping changes, so that specificity is lacking.

Further, in Japanese Patent Laid-open No. 2002-04563, technology is disclosed in which the linear expansion rate difference $\Delta\alpha$ between a laminated lenticular lens sheet and fresnel lens sheet is made $5.5\times10^{-5}$ (/° C.) or less. In this technology, material having a linear expansion rate of $3\times10^{-5}$ (/° C.) or less is further laminated on the uppermost surface. By this means, bimetal warping changes are suppressed, and the direction of occurrence of warping is controlled so as to result in convexity on the image light source side. In this Japanese Patent Laid-open No. 2002-04563 also, there is no mention of the Young's modulus, which is important in relation to warping changes, and specificity is lacking.

In this way, technology to reduce warping changes in sheets with respect to temperature changes have been disclosed in the past. On the other hand, with the object of obtaining multifunctionality in screens, in recent years there have been numerous sheets with multilayer configurations using different materials. In a multilayer sheet, if there is a difference in linear expansion coefficients, sheet warping changes similarly to bimetals with temperature changes.

A diffuser plate to prevent brightness unevenness, and a lens sheet or similar to condense light which has passed through the diffuser plate, and similar are mounted to the backlight provided in the rear portion of the liquid crystal display panel. The lens sheet is formed by layering a base material sheet layer and lens layers of different materials, and is formed by layering a plurality of diffuser sheets. In a liquid crystal display apparatus, in addition to changes in the ambient temperature, heat emitted from the light source positioned therewithin and other heat may be generated, so that there is the problem of the occurrence of sheet warping of the lens sheet of a plurality of layers.

In order to suppress sheet warping, methods such as reducing the differences between the linear expansion coefficients of the different layers, or of making one of the layers extremely rigid, or similar are conceivable. In Japanese Patent Laid-open No. 2006-208930, a configuration is disclosed in which a layered sheet is formed from different materials or formed by laminating a plurality of light diffuser sheets. However, due to the multifunctionality of the sheet itself, problems with sheet manufacture, and similar, it is not necessarily possible to set appropriate values of the thermal expansion coefficients, Young's modulus, and thickness for each of the layers, and in some cases conventional technology cannot be applied.

Further, in liquid crystal display apparatuses in particular, when warping occurs in a lens sheet which is to be incorporated in a backlight, there is the possibility of inducing (1) partial damage to the lens sheet, due to contact of the lens sheet with the liquid crystal display panel or light source, and (2) brightness unevenness, arising from changes in the view angle created by the lens sheet.

In Japanese Patent Laid-open No. 2007-109608, technology is disclosed in which flexing-prevention pins are provided on the light source side such that, when the sheet is warped into a convex shape on the light source side, the effect of the warping is alleviated. However, when the amount of warping is large, contact between the lens sheet and the flexing-prevention pins may induce partial damage in the lens sheet. Also, using the technology of Japanese Patent Laid-open No. 2007-109608, it is difficult to accommodate cases in which the lens sheet is warped in a convex shape on the liquid crystal display panel side.

DISCLOSURE OF THE INVENTION

Problem to be solved by the Invention

In this way, conventional lens sheets for a screen have the problem that it is difficult to reduce warping due to temperature changes.

The present invention has been devised in light of this problem, and has as an object to provide a laminated sheet and a display screen which enable reliable reduction of warping due to temperature changes.

Means for solving the Problem

A laminated sheet according to the present invention is a laminated sheet, in which a plurality of screen sheets are stacked, including: a multilayer sheet A including two or more layers with different linear expansion coefficients; and a single sheet B which is a sheet other than the multilayer sheet A, wherein at least in a temperature range from 10° C. to 30° C., expressions (*1), (*2) and (*3) are satisfied, and, when all sheets are stacked, either (i) or (ii) below applies:

[E 1]

$$|\Delta \theta_A| > 0 \qquad (^*1)$$

$$-2 \le \delta_{AB} \le 10 \text{ mm} \qquad (^*2)$$

$$\delta_{AB} = \frac{E_A t_A^3 \delta_A + E_B t_B^3 \delta_B}{E_A t_A^3 + E_B t_B^3} \qquad (^*3)$$

where
(i) a viewing-side sheet is convex on the image light source side, and an image light source-side sheet is convex on the viewing side; and
(ii) the viewing-side sheet and the image light source side-sheet are both convex on the image light source side, and a curvature of the viewing-side sheet is greater than a curvature of the image light source-side sheet.
where,
$\Delta\theta_A$: a rate of change in a warping $\delta_A$ of the multilayer sheet A due to changes in the temperature (mm/° C.);
$\delta_{AB}$: a warping of the entirety of the sheets when all sheets are stacked, and the four corners thereof are fixed without a frame (mm: positive figures are the convex direction on the image light source side);
$\delta_A$: a warping of the multilayer sheet A (mm: positive figures are the convex direction on the image light source side);
$\delta_B$: a warping of the sheet B (mm: positive figures are the convex direction on the image light source side);
$E_A$: Young's modulus of the multilayer sheet A (Pa);
$E_B$: Young's modulus of the sheet B (Pa);
$t_A$: a thickness of the multilayer sheet A (mm); and
$t_B$: a thickness of the sheet B (mm).

Preferably, the multilayer sheet A is a lenticular lens sheet, and the sheet B is a fresnel lens sheet.

An laminated sheet according to the present invention is a laminated sheet, in which a plurality of screen sheets are stacked, including: a multilayer sheet A including two or more layers with different linear expansion coefficients; and a multilayer sheet B which is a sheet other than the multilayer sheet A, and including two or more layers with different thermal expansion coefficients, wherein at least in a temperature range from 10° C. to 30° C., expressions (*4), (*5) (*6) and (*7) are satisfied, and, when all sheets are stacked, either (i) or (ii) below applies:

[E 2]

$$|\Delta \theta_A| > 0 \qquad (^*4)$$

$$|\Delta \theta_B| > 0 \qquad (^*5)$$

$$-2 \le \delta_{AB} \le 10 \text{ mm} \qquad (^*6)$$

$$\delta_{AB} = \frac{E_A t_A^3 \delta_A + E_B t_B^3 \delta_B}{E_A t_A^3 + E_B t_B^3} \qquad (^*7)$$

where
(i) a viewing-side sheet is convex on the image light source side, and an image light source-side sheet is convex on the viewing side; and
(ii) the viewing-side sheet and the image light source side-sheet are both convex on the image light source side, and a curvature of the viewing-side sheet is greater than a curvature of the image light source-side sheet,
where,
$\Delta\theta_A$: a rate of change in a warping $\delta_A$ of the multilayer sheet A due to changes in the temperature (mm/° C.);
$\Delta\theta_B$: a rate of change in a warping $\delta_B$ of the multilayer sheet B due to changes in the temperature changes (mm/° C.);
$\delta_{AB}$: a warping of the entirety of the sheets when all sheets are stacked, and the four corners thereof are fixed without a frame (mm: positive figures are the convex direction on the image light source side);
$\delta_A$: a warping of the multilayer sheet A (mm: positive figures are the convex direction on the image light source side);
$\delta_B$: a warping of the multilayer sheet B (mm: positive figures are the convex direction on the image light source side);
$E_A$: Young's modulus of the multilayer sheet A (Pa);
$E_B$: Young's modulus of the multilayer sheet B (Pa);
$t_A$: a thickness of the multilayer sheet A (mm); and
$t_B$: a thickness of the multilayer sheet B (mm).

Preferably the multilayer sheet A is a lenticular lens sheet, and the multilayer sheet B is a fresnel lens sheet.

A display screen according to the present invention includes an above-explained laminated sheet.

Advantageous Effects of the Invention

By means of this invention, a laminated sheet for a display screen, and a display screen, in which warping due to temperature changes can be reliably reduced, can be provided.

BRIEF DESCRIPTION OF THE DRAWINGS

FIG. 8 is a table used to explain laminated sheets in embodiments;

FIG. 9A is a table used to explain laminated sheets in embodiments;

FIG. 9B is a table used to explain laminated sheets in embodiments;

FIG. 10 is a table used to explain laminated sheets in embodiments;

FIG. 11A is a table used to explain laminated sheets in embodiments; and

FIG. 11B is a table used to explain laminated sheets in embodiments.

DESCRIPTION OF REFERENCE NUMERALS

Figure 1:
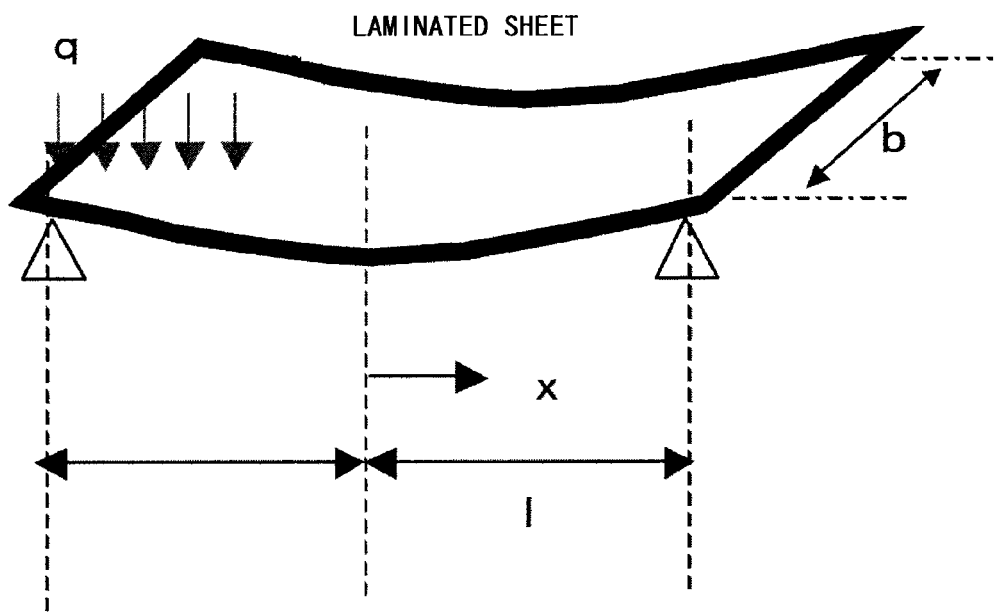
FIG. 1 is a schematic diagram used to explain the principle of a laminated sheet of the invention.

1 a rear projection-type screen; 11 a fresnel lens sheet; 111 a base material; 112 a fresnel lens; 12 a lenticular lens sheet; 121 a base material; 122 a lenticular lens; 123 a light shield pattern; 13 a front sheet.

BEST MODES FOR CARRYING OUT THE INVENTION

Below, preferred aspects of the invention are explained, referring to the drawings.

A display screen of this invention is a screen which combines two or more non-integral sheet members; at least one sheet is a multilayer sheet. In this display screen, by appropriately designing the material configuration and layer thickness configuration, changes in warping overall due to temperature changes are reduced.

First, a laminated sheet configuration of this invention is explained.

A laminated sheet of the present invention stacks a plurality of screen sheets, and comprises a multilayer sheet A, having two or more layers with different linear expansion coefficients, and a single sheet B which is a sheet other than the multilayer sheet A.

Further, in a laminated sheet of this invention, the sheet on the viewing side is convex on the image light source side, and the sheet on the image light source side is convex on the viewing side. Further, in a laminated sheet of this invention, the viewing-side sheet and the image light source-side sheet are both convex on the image light source side, and the curvature of the viewing-side sheet is larger than the curvature of the image light source-side sheet. In such a laminated sheet, the occurrence of gaps between the sheets A and B can be prevented, and the occurrence of floating between the sheets A and B can be prevented.

Further, in a laminated sheet of this invention, at least in the temperature range from 10° C. to 30° C., the following equations (1), (2), and (3) are satisfied.

[E 5]

$$|\Delta \theta_A| > 0 \tag{1}$$

$$-2 \leq \delta_{AB} \leq 10 \text{ mm} \tag{2}$$

$$\delta_{AB} = \frac{E_A t_A^3 \delta_A + E_B t_B^3 \delta_B}{E_A t_A^3 + E_B t_B^3} \tag{3}$$

where, $\Delta\theta_A$: rate of change in the warping $\delta_A$ of the multilayer sheet A due to changes in the temperature (mm/° C.);

$\delta_{AB}$: warping of the entirety of the sheets, when all sheets are stacked and the four corners thereof are fixed without a frame (mm: positive figures indicate warping in the convex direction on the image light source side);

$\delta_A$: warping of the multilayer sheet A (mm: positive figures are the convex direction on the image light source side);

$\delta_B$: warping of the sheet B (mm: positive figures are the convex direction on the image light source side);

$E_A$: Young's modulus of the multilayer sheet A (Pa);

$E_B$: Young's modulus of the sheet B (Pa);

$t_A$: thickness of the multilayer sheet A (mm); and $t_B$: thickness of the sheet B (mm).

The laminated sheet of this invention satisfies equation (1), and so comprises sheets the warping of which changes. In this respect, the laminated sheet of this invention differs greatly from conventional technology which reduces warping changes. Further, the laminated sheet of this invention satisfies equation (2), and so the screen overall can be substantially planar, or can have some convexity on the light source side, to the extent that pin strain is not prominent. Further, the laminated sheet of this invention satisfies equation (3), so that taking into account the Young's modulus, thickness, and warping amount of each sheet, the warping amount of the entire sheet can be made small.

On the other hand, a laminated sheet of this invention can employ as sheet B a multilayer sheet similar to sheet A. In this case, at least in the temperature range from 10° C. to 30° C., equations (4), (5), (6) and (7) are satisfied.

[E 6]

$$|\Delta \theta_A| > 0 \tag{4}$$

$$|\Delta \theta_B| > 0 \tag{5}$$

$$-2 \leq \delta_{AB} \leq 10 \text{ mm} \tag{6}$$

$$\delta_{AB} = \frac{E_A t_A^3 \delta_A + E_B t_B^3 \delta_B}{E_A t_A^3 + E_B t_B^3} \tag{7}$$

where $\Delta\theta_A$: rate of change in the warping $\delta_A$ of the multilayer sheet A due to changes in the temperature (mm/° C.);

$\Delta\theta_B$: rate of change in the warping $\delta_B$ of the multilayer sheet B due to changes in the temperature (mm/° C.);

$\delta_{AB}$: warping of the entirety of the sheets, when all sheets are stacked and the four corners thereof are fixed without a frame (mm; positive figures indicate warping in the convex direction on the image light source side);

$\delta_A$: warping of the multilayer sheet A (mm: positive figures are the convex direction on the image light source side);

$\delta_B$: warping of the multilayer sheet B (mm: positive figures are the convex direction on the image light source side);

$E_A$: Young's modulus of the multilayer sheet A (Pa);

$E_B$: Young's modulus of the multilayer sheet B (Pa);

$t_A$: thickness of the multilayer sheet A (mm); and $t_B$: thickness of the multilayer sheet B (mm).

In this invention, the Young's modulus of the multilayer sheet A and the Young's modulus of the multilayer sheet B are the arithmetic means of the thickness for each layer and Young's moduli for each layer of the multilayer sheet.

In this case also, advantageous results similar to those when the sheet B is not a multilayer sheet are obtained. Specifically, the laminated sheet of this invention satisfies equations (4) and (5), and so comprises sheets in which the warping changes. In this respect, a laminated sheet of this invention differs greatly from conventional technology, in which warping changes are reduced.

Further, the laminated sheet of this invention satisfies equation (6), so that the screen as a whole can be made either substantially planar, or somewhat convex on the light source side, to the extent that pin strain is not prominent. The laminated sheet of this invention satisfies equation (7), so that, considering the Young's modulus, thickness, and warping amount of each sheet, changes in warping due to temperature changes can be made to cancel. By this means, even when there are changes in the warping of individual sheets due to temperature changes, the change in warping of the sheet overall can be made small.

Next, a laminated sheet of this invention is explained in greater detail.

In general, the fresnel lens sheet and lenticular lens sheet used in a rear projection-type screen are provided with bowing so as to bend the sheet about the short-edge axis. This is because rigidity is poor when bending about the long-edge axis compared with bending about the short-edge axis, and moreover spherical-face bowing, to provide bowing about both the short and long edges, results in insufficient stability during measurements. A beam model in material dynamics can be used to solve for the forces existing within a screen provided with bowing about the short-edge axis.

Specifically, flexing of a beam supported at both ends is expressed by equation (8). This flexing of a beam supported at both ends is shown in FIG. 1.

[E 7]

$$\frac{d^3\delta}{dx^3} = -\frac{F}{EI_z} \quad (8)$$

where,
δ: warping (flexing) (mm)
x: distance from the center of the beam (mm)
F: force applied to the screen (kgf)
E: elasticity ratio (kgf/mm$^2$)
I$_z$: cross-sectional second-order moment (mm$^4$)

Integrating equation (8) gives

[E 8]

$$\frac{d^2\delta}{dx^2} = -\frac{F}{EI_z}(x+c1) \quad (9)$$

Integrating again gives

[E 9]

$$\frac{d\delta}{dx} = -\frac{F}{EI_z}\left(\frac{x^2}{2} + c_1 x + c_2\right) \quad (10)$$

[E 10]

$$\delta = -\frac{F}{EI_z}\left(\frac{x^3}{6} + \frac{c_1 x^2}{2} + c_2 x + c_3\right) \quad (11)$$

Here, $c_1$, $c_2$, and $c_3$ are integration constants, and are determined by the screen size and the load distribution. If the quantity in parentheses on the right-hand side of equation (11) is represented by C, then from equation (12) it is seen that F and δ are in a proportional relationship.

[E 11]

$$F = \frac{E}{C} I_z \delta \quad (12)$$

In a rectangular cross-section, $I_z = bt^3/12$, so that equation (12) can be converted into equation (13).

[E 12]

$$F = \frac{b}{12C} E t^3 \delta \quad (13)$$

In particular, in a rear project-type screen, in general the lenticular lens sheet and fresnel lens sheet are pressed together and caused to be in close contact. By forming these lens sheets as an integral unit, the warping of the sheets cancels each other out, and the screen approaches a planar shape. This calculation can also be applied to the pressing-together of a front plate and a lenticular sheet.

In general, the resultant force SF when two sheets A and B are brought into close contact is given by equation (14).

[E 13]

$$SF = \frac{b}{12C}(E_A t_A^3 \delta_A + E_B t_B^3 \delta_B) \quad (14)$$

where,
SF: resultant force for sheets A and B;
$\delta_A$: warping of the sheet A (mm; positive figures are the convex direction on the image light source side);
$\delta_B$: warping of the sheet B (mm; positive figures are the convex direction on the image light source side);
$E_A$: Young's modulus of the sheet A (Pa);
$E_B$: Young's modulus of the sheet B (Pa);
$t_A$: thickness of the sheet A (mm); and
$t_B$: thickness of the sheet B (mm).

Here, the inventors focused on the fact that even when a multilayer sheet in which bimetal warping changes occur is comprised, a plurality of sheets can be regarded as a single sheet only when the one of the following conditions (i) or (ii) is satisfied, so that there is a range within which the warping value of the stacked sheets as a whole can be tolerated.

(i) The viewing-side sheet is convex on the image light source side, and moreover the image light source-side sheet is convex on the viewing side.

(ii) The viewing-side sheet and the image light source side-sheet are both convex on the image light source side, and the curvature of the viewing-side sheet is greater than the curvature of the image light source-side sheet.

If equation (14) is expressed as in the right side of equation (15), then the warping amount when a plurality of sheets are regarded as a single sheet can be given. Hence equation (15) can be used to determine the warping amount when regarding a plurality of sheets as a single sheet, expressed by equation (16).

[E 14]

$$SF = \frac{b}{12C}(E_A t_A^3 \delta_A + E_B t_B^3 \delta_B) \quad (15)$$
$$= \frac{b}{12C}(E_A t_A^3 + E_B t_B^3)\delta_{AB}$$

[E 15]

$$\delta_{AB} = \frac{E_A t_A^3 \delta_A + E_B t_B^3 \delta_B}{E_A t_A^3 + E_B t_B^3} \quad (16)$$

Here $\delta_{AB}$ is the warping of the sheets overall, when all the sheets are stacked and the four corners fixed without a frame (mm; positive figures indicate warping in the convex direction on the image light source side).

Conventional sheets are made to conform to rigid sheets, or, when there are a plurality of layers, the linear expansion coefficients are made as close as possible. In contrast, a laminated sheet of this invention maintains substantial flatness overall as a stacked sheet, even when for example a sheet in which bimetal warping changes occur is comprised, by satisfying the following conditions (i) and (ii). These conditions (i) and (ii) are determined based on equation (8) derived from the Young's modulus, thickness, and warping amount for each sheet.

Further, in a laminated sheet of this invention, even when the warping of the plurality of sheets changes due to temperature changes, humidity changes, or various other changes in the environment, the change in warping overall for the combination of sheets can be reduced.

Specifically, a laminated sheet of this invention has a configuration such that changes in warping due to environmental changes are canceled out. More specifically, by employing a configuration such that there are no changes in SF in equation (14), fluctuations in warping of the screen do not occur. That is, by designing the screen to have a layer configuration and initial warping amount such that ΔSF=0 is approached, a configuration can be realized such that ΔSF in equation (17) is made small. By this means, the amount of screen warping change can be kept within the tolerance range, so that image degradation does not occur.

[E 16]

$$\Delta SF = E_A t_A^3 \Delta\theta_A + E_B t_B^3 \Delta\theta_B \quad (17)$$

where,
ΔSF: change in the resultant force of the sheets A and B due to temperature changes;
where $\Delta\theta_A$: rate of change in the warping $\delta_A$ of sheet A due to these temperature changes (mm/° C.: positive figures indicate warping in the convex direction on the image light source side);
$\Delta\theta_B$: rate of change in the warping $\delta_B$ of sheet B due to these temperature changes (mm/° C.: positive figures indicate warping in the convex direction on the image light source side);
$E_A$: Young's modulus of sheet A (Pa);
$E_B$: Young's modulus of sheet B (Pa);
$t_A$: thickness of sheet A (mm); and
$t_B$: thickness of sheet B (mm).

The method of calculating the values of $\Delta\theta_A$ and $\Delta\theta_B$ due to temperature changes is explained below. The Young's modulus and thickness of the sheets A and B were the average values for the lenticular sheet as a whole. The warping amount of the combined sheet as a whole in this invention was taken to be the value when all peripheral portions of all the stacked sheets were fixed.

Next, a laminated sheet of this invention is explained in still greater detail. Here, a quantitative explanation is given for the canceling-out of the warping in two sheets, A and B.

First, a case is considered in which sheets are in fixed-temperature conditions (hereafter called initial conditions). When sheets A and B are stacked, if the force pressing the screen face due to the warping of sheets A and B themselves is F, then this force is given by equation (18). Here, the flexing curvature of sheet A is $\theta_A$, and the rigidity of the sheet is $D_A$. And, the flexing curvature of sheet B is $\theta_B$, and the rigidity of the sheet is $D_B$. From the mechanics of materials, it is clear that the rigidity of each is proportional to the elasticity ratio E and the third power of the sheet thickness t.

[E 17]

$$F = D_A\theta_A - D_B\theta_B = E_A t_A^3 \theta_A - E_B t_B^3 \theta_B \quad (18)$$

In equation (18), when F=0 is satisfied, the warping of the combined sheets A, B results in a flat shape. As explained above, for rear projection-type screens in general, it is desirable that the incident face be flat or be slightly convex on the image side. Hence if sheet A is positioned on the incident-face side, then F need not be zero, but may have a slight negative value.

Equation (18) is for a case in which the sheets A and B are under fixed-temperature conditions; here a case is considered in which the curvature changes due to a temperature change. In order for there to be no change in the warping of the initial state curvature for the screen overall with sheets in close contact, the forces pressing against each other should be equal. The method of calculation of the change in curvature is explained below. The amount of change in pressing forces ΔF due to a temperature change can be calculated using equation (17).

As explained above, in a laminated sheet of this invention, even when there are multilayer sheets in which the sheet curvature θ changes with temperature changes due to bimetal phenomena, the forces pressing in mutual opposition are canceled. By this means, a laminated sheet can be realized the overall warping of which does not change.

According to a design method of this invention, by adjusting any one of, or a plurality of, the linear expansion coefficients α, thickness, and Young's modulus of the sheet materials, a sheet can be provided with overall warping changes suppressed. As a result, freedom in choosing sheet materials can be enhanced. In order to adjust the linear expansion coefficients α and Young's modulus, for example, elastomer modification or other methods can be used for acrylic resins (PMMA) and methacrylic styrene copolymer (MS) resins.

Next, a more tangible explanation of a laminated sheet of the invention is given.

Here, an explanation is given of a laminated sheet in which two sheets are stacked; but the explanation is similar for a laminated sheet in which three or more sheets are stacked, and this invention can be similarly applied. The explanation considers temperature changes, but similar remarks apply to warping changes due to changes in vapor absorption, water absorption, or other environmental changes, and the invention can be similarly applied.

Figure 2A:
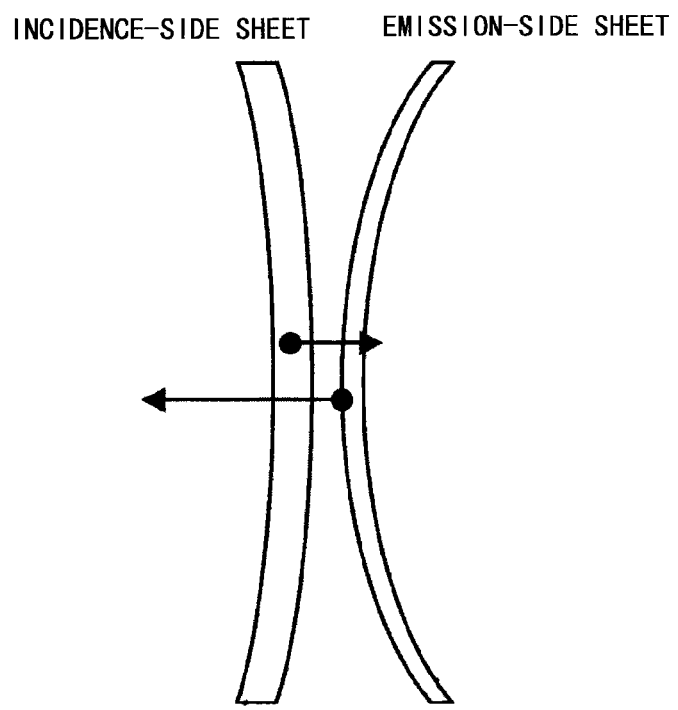
FIG. 2A is a schematic diagram used to explain a laminated sheet of the invention.

The schematic diagram of FIG. 2A shows a case in which each of the sheets, warped on the inside, changes so as to push against the other. In this case, both the warped incidence-side and emission-side sheets are in states such that the warping increases with temperature changes; but by stacking the two sheets, a design is possible in which the sheets are flat or are convex on the incidence side.

Figure 2B:
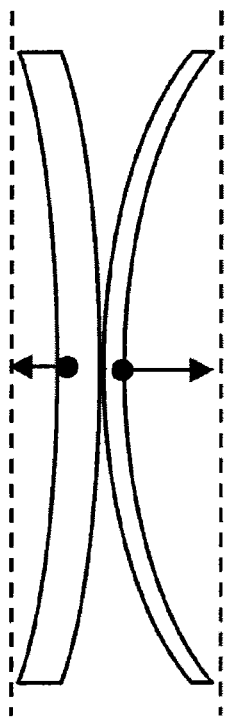
FIG. 2B is a schematic diagram used to explain a laminated sheet of the invention.

The schematic diagram of FIG. 2B shows a case in which the warping amounts with temperature changes are decreased for each of the sheets, warped on the inside. This case corresponds to the opposite of the temperature change for the case shown in FIG. 2A, and a state can be maintained in which overall the sheets are in close contact until the emission-side sheet becomes substantially flat.

Figure 3A:
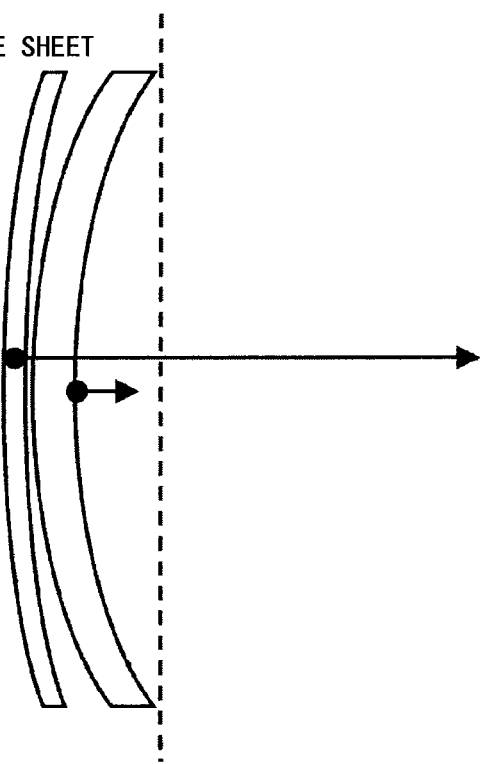
FIG. 3A is a schematic diagram used to explain a laminated sheet of the invention.

The schematic diagram of FIG. 3A shows a case in which both sheets return to the emission side. In this case, whereas the warped incidence-side sheet can return arbitrarily to the emission side, the warped emission-side sheet can only return a small distance to the emission side. For this reason, the emission-side sheet is made from a comparatively rigid sheet.

Figure 3B:
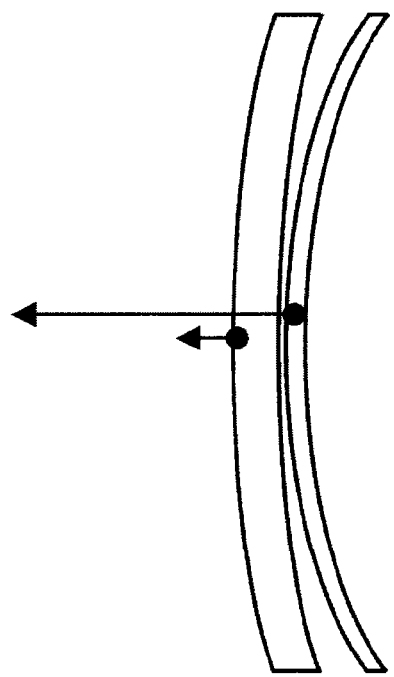
FIG. 3B is a schematic diagram used to explain a laminated sheet of the invention.

The schematic diagram of FIG. 3B shows a case in which warping of each of the sheets changes on the incidence side. In this case, the warped incidence-side sheet can change only a small amount on the incidence side, whereas the warped emission-side sheet can change arbitrarily on the incidence side. For this reason, the incidence-side sheet is made from a comparatively rigid sheet.

The methods used above for calculating $\Delta\theta$ $\Delta\theta_A$, $\Delta\theta_B$) due to temperature and the change in curvature due to temperature changes are explained (for details, refer to Japanese Patent Laid-open No. 2005-49846).

Figure 4:
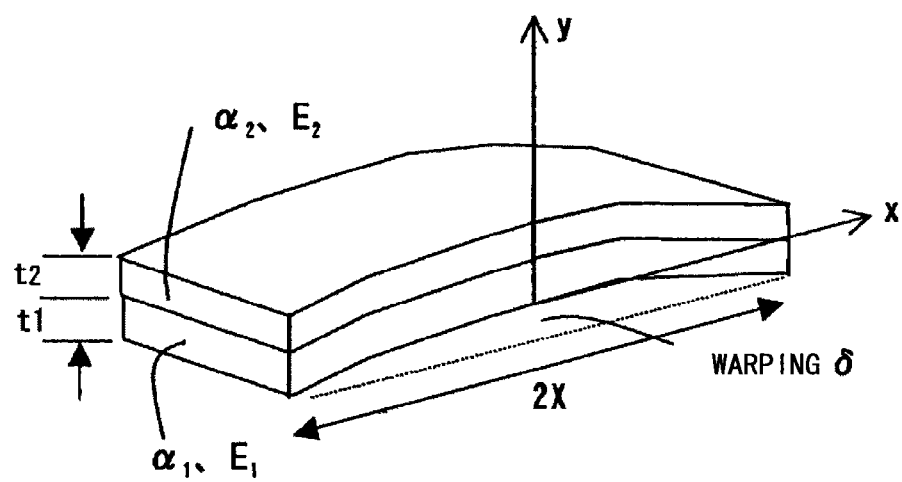
FIG. 4 is a schematic diagram used to explain the principle of a laminated sheet of the invention.

First, the stress and bending moment occurring in a two-layer laminated sheet due to thermal stresses are determined. For purposes of explanation, the coordinate system shown in FIG. 4 is adopted, and it is assumes that sheets of the first layer (material 1) and second layer (material 2) are provided in the order of the Y-axis direction.

The stress and bending moment occurring in a multilayer member due to thermal stresses are given by the simultaneous system of equations of equation (19) and equation (20).

[E 18]

$$F = \int_0^T E(y)\{e(y) - e0 - \theta y\} dy \quad (19)$$

$$M = \int_0^T E(y)\{e(y) - e0 - \theta y\} y dy \quad (20)$$

where,
F: stress per unit width occurring in the multilayer member due to thermal expansion (N/mm);
M: bending moment per unit width occurring in the multilayer member due to thermal expansion (Nmm/mm);
$\theta$: curvature after lamination of the laminated sheet (1/mm);
$t_i$: thickness of the ith layer of the laminated sheet (mm) (i=1, 2, . . . , n);
y: distance in the thickness direction from the surface on one side to the surface on the opposite side, when the surface on the one side of the laminated sheet is 0 (mm);
E(y): elasticity ratio at y in the laminated sheet;
e(y): free elongation, before the materials are laminated, at y in the laminated sheet (dimensionless);
e0: an elastic modulus, elongation at y=0 (mm) in the laminated sheet after lamination (dimensionless); and
$\alpha$(y): linear expansion rate of material at y in the laminated sheet (1/° C.).

Further, because E(y) and e(y) are generally determined by the material, when the distance y from the fiducial surface (y=0) in the thickness direction is in the ith layer, $E(y)=E_i$ and $e(y)=e_i$.

Figure 5:
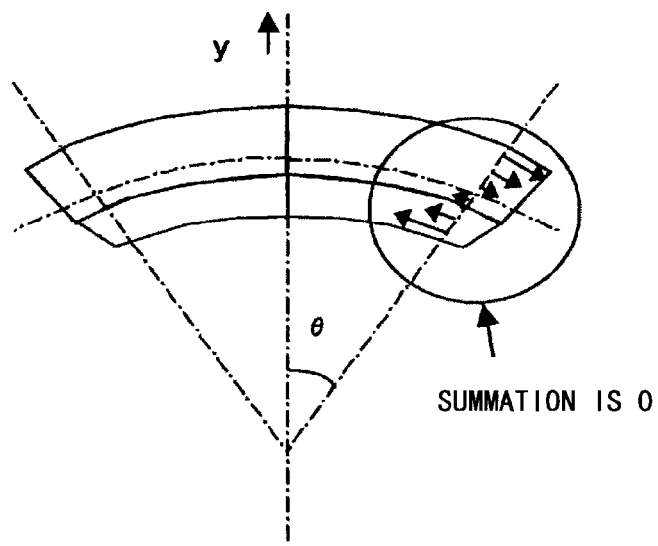
FIG. 5 is a schematic diagram used to explain the principle of a laminated sheet of the invention.
Figure 6:
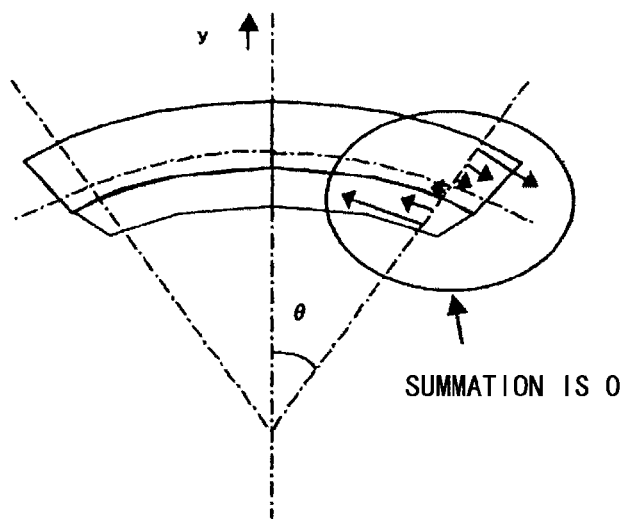
FIG. 6 is a schematic diagram used to explain the principle of a laminated sheet of the invention.

FIG. 5 and FIG. 6 show the distribution of stress and bending moment in a laminated sheet. Here, equations (19) and (20) are integrated with respect to y, and if a state in which no external forces act is assumed, that is, F=0 and M=0, then equations (21) and (22) are obtained.

[E 19]

$$F = e_1 E_1 t_1 + e_2 E_2 t_2 - e_0 \begin{pmatrix} E_1 t_1 + \\ E_2 t_2 \end{pmatrix} - \frac{\theta}{2} \begin{Bmatrix} E_1 t_2^2 - E_2 t_1^2 + \\ E_2 (t_1 + t_2)^2 \end{Bmatrix} \quad (21)$$
$$= 0$$

$$M = \begin{Bmatrix} e_1 E_1 t_1^2 - e_2 E_2 t_2^2 + \\ e_2 E_2 (t_1 + t_2)^2 \end{Bmatrix} - \frac{1}{2} e^0 \begin{Bmatrix} E_1 t_2^2 - E_2 t_1^2 + \\ e_2(t_1 + t_2)^2 \end{Bmatrix} - \frac{\theta}{3} \begin{Bmatrix} E_1 t_1^3 - E_2 t_1^3 + \\ E_2(t_1 + t_2)^3 \end{Bmatrix} \quad (22)$$
$$= 0$$

In the system of simultaneous equations (21) and (22), upon canceling $e_0$ and solving for the curvature $\theta$, equation (23) is obtained.

[E 20]

$$\theta = -6 \frac{E_1 E_2 (e_1 - e_2) \times t_1 t_2 (t_1 + t_2)}{E_1^2 t_1^4 + E_2^2 t_2^4 + 2 E_1 E_2 t_1 t_2 (2 t_1^2 + 3 t_1 t_2 + 2 t_2^2)} \quad (23)$$

If the linear expansion rate of the ith layer is $\alpha_i$, then the free elongation $e_i$ occurring due to a temperature difference $\Delta K$ is as given by equation (24).
[E 21]

$$e_i = \alpha_i \times \Delta K \quad (24)$$

If the rate of change of the curvature with temperature is $\epsilon$, then $\epsilon = \theta/\Delta K$, and so from equations (23) and (24), $\epsilon$ is given by equation (25).

[E 22]

$$\varepsilon = \frac{-6 E_1 E_2 (\alpha_1 - \alpha_2) \times t_1 t_2 (t_1 + t_2)}{E_1^2 t_1^4 + E_2^2 t_2^4 + 2 E_1 E_2 t_1 t_2 (2 t_1^2 + 3 t_1 t_2 + 2 t_2^4)} \quad (25)$$

The smaller the value of the curvature rate of change $\epsilon$ with temperature, the smaller is the warping which occurs due to temperature changes. Hence ideally $\epsilon=0$, and in this case, theoretically, warping due to temperature does not occur at all. However, because $t_1$, $t_2$, $E_1$, $E_2$ are all positive constants, $\epsilon=0$ only when $\alpha_1=\alpha_2$. Because $\alpha_1$ and $\alpha_2$ are determined by the respective materials, when different materials are comprised normally $\alpha_1$ will not equal $\alpha_2$, so that $\epsilon=0$ cannot be achieved. Hence it is required to change the thickness, elasticity ratio, and linear expansion coefficient such that $\epsilon$ is made as small as possible.

Because alterations of the elasticity ratio and linear expansion rate are generally accompanied by changes in the material, when for purposes of optical design the materials have been determined to some degree, it is difficult to greatly change the elasticity ratio and linear expansion rate. When the layer thicknesses are determined in order to reduce the thickness, by increasing the ratio of the layer thicknesses, the rate of change of the curvature $\epsilon$ can be reduced.

In this way, based on equation (22), the $\Delta\theta$ and curvature change with temperature can be determined. And, by combining the values of the linear expansion rate, thickness, and elasticity ratio of each layer in the laminated sheet, the curvature refractivity $\epsilon$ can be reduced. By designing the linear expansion rate, thickness, and elasticity ratio of each layer so as to reduce the curvature rate of change $\epsilon$, warping can be reduced. Even when there is some constrain on one among the linear expansion rate, thickness, and elasticity ratio, by performing design which considers the values of the linear expansion rate, thickness, and elasticity ratio, warping can be reduced.

For example, when combining materials with greatly different linear expansion rates into a multilayer structure, by adjusting the thicknesses and elasticities, warping due to temperature changes can be made small. And, even when the overall thickness is constrained due to demands for a thinner shape or when the thickness of one layer is predetermined, the other parameters can be adjusted such that the curvature rate of change $\epsilon$ is reduced. In particular, by designing and manufacturing sheets for display screens, different materials, which in the background art had been difficult to use in combination due to degradation of images and image quality, can be employed in sheets for display screens.

Figure 7:
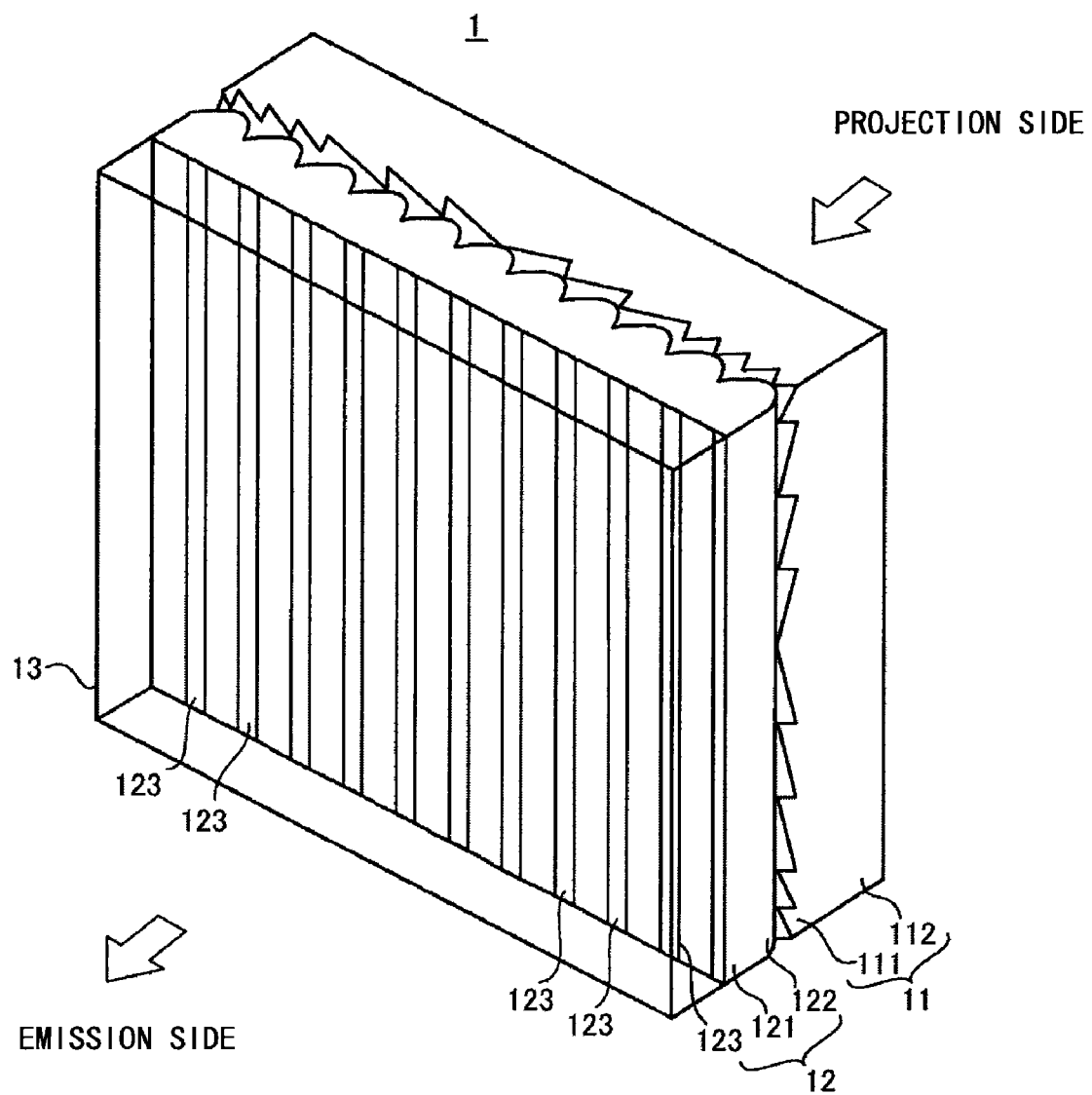
FIG. 7 is a perspective schematic diagram showing an example of the configuration of a rear-projection type screen of the invention.

As a preferred example, the above laminated sheet can be applied to a rear projection-type screen. FIG. 7 is used to explain the configuration of a rear projection-type screen of this invention. FIG. 7 is a perspective schematic diagram showing an example of the configuration of a rear projection-type screen of this invention.

As shown in FIG. 7, the rear projection-type screen 1 comprises a fresnel lens sheet 11, lenticular lens sheet 12, and front sheet 13. The fresnel lens sheet 11, lenticular lens sheet 12, and front sheet 13 are arranged in order from the image light projection side toward the image light emission side.

The fresnel lens sheet 11 is one example of an optical sheet having a function of condensing incident light in the direction of the viewer. The fresnel lens sheet 11 has a fresnel lens 112 on one face of a base material 111; the fresnel lens 112 is configured from a sawtooth-shape fresnel lens the tips of which are sharp, and is concave-convex facing the image light emission side. This fresnel lens sheet 11 is equivalent to sheet B in the above-described laminated sheet, and more specifically, has a two-layer structure comprising the base material 111 and the fresnel lens 112.

The lenticular lens sheet 12 is one example of an optical sheet having a function of diffusing light emitted from a fresnel lens sheet 11 in the horizontal and vertical directions. The lenticular lens sheet 12 has a lenticular lens 122 on one face of the base material 121; the lenticular lens 122 comprises a semicylindrical convex-shape lenticular lens. The lenticular lens 122 is concave-convex facing the image light projection side. Hence the lenticular lens 122 of the lenticular lens sheet 12 opposes the fresnel lens 112 of the fresnel lens sheet 11.

A light shield pattern 123 which shields and blocks light is formed, arranged in parallel configuration on the flat face on the side opposite the lens face of the lenticular lens 122, in non-condensing regions in which image light is not transmitted.

The front sheet 13 has a function of diffusing emitted light and protecting the screen front face. This front sheet 13 is laminated onto the face of the light shield pattern 123, with an optical-use adhesive or viscous agent intervening. In other words, the front sheet 13 and lenticular lens sheet 12 have an integral configuration by means of adhesion. The sheet configured integrally from the lenticular lens sheet 12 and front sheet 13 is equivalent to the above-described sheet A of the laminated sheet, and has a two-layer structure comprising the lenticular lens sheet 12 and the front sheet 13.

EMBODIMENTS

In these embodiments, a lenticular lens sheet was used as sheet A and a fresnel lens sheet was used as sheet B, and these lens sheets were piled. Here, sheet A was positioned on the viewing side, and sheet B was positioned on the image light source side. Also, in these embodiments, the invention was executed for cases in which the lens sheets were warped facing each other, as shown in FIG. 2A.

Embodiment 1

Sheet A was a lenticular lens sheet, obtained by laminating a lenticular lens formed by extrusion molding of an MS system resin, and a front plate formed by separate extrusion molding of an MS system resin, using an extremely thin adhesive layer. The initial-state warping of sheet A, placed on the viewing side, was 1.9 mm at 20° C.

Sheet B was a fresnel lens sheet, obtained by forming a fresnel lens of urethane-system ultraviolet-curing resin on one face of an MS-system resin base plate. The initial-stage warping of sheet B, placed on the image light source side, was −14.5 mm at 20° C.

Here, "+" for warping changes are in the convex direction on the image light source side, and "−" are in the convex direction on the viewing side. The front plate side of sheet A was positioned on the viewing side, and the fresnel lens face of sheet B was positioned on the viewing side.

The table in FIG. 8 gives details of the layer configuration, materials, and physical properties of sheets A and B. Sheet A was on the emission side, and sheet B was on the incidence side. Also, the first layer was on the emission side and the second layer was on the incidence side. In the figure, "lenticular" means the lenticular lens sheet. Similarly, "F base plate" means the base plate of the fresnel lens sheet, and "2P lens layer" means the ultraviolet-curing resin lens layer. FIG. 9A and FIG. 9B show examples of calculations for cases in which the temperatures of sheets A and B changes in the range −10° C. to 50° C.

As shown in FIG. 9A and FIG. 9B, as the temperature changes from low to high temperatures, the warping of sheet A changed so as to increase in the image light source side convex direction. On the other hand, the warping of sheet B changes so as to increase in the viewing side convex direction.

Thus in Embodiment 1, the thicknesses of the two sheets A and B were different by a factor of 2 or more, the elasticities of the layers were different by up to a factor of 2, and the linear expansion rates among layers were also different. However, overall the sheets, when stacked, remained in a state of substantially zero warping over the range −10° C. to 50° C., due to the fact that the direction of pressing-together of the two sheets due to warping were opposite and the magnitudes of the forces were substantially equal.

Embodiment 2

In Embodiment 2, sheet A was a lenticular lens sheet with configuration similar to that in Embodiment 1 but different material composition and layer thicknesses; the initial-state warping at 20° C. was 23.4 mm.

Sheet B was the same fresnel lens sheet as in Embodiment 1, but the initial-stage warping at 20° C. was −3.0 mm.

The table in FIG. 8 shows details of the layer configuration, materials, and physical properties of sheets A and B. And, FIG. 9A and FIG. 9B show examples of calculations for cases in which the temperature of sheets A and B varied in the range −10° C. to 50° C.

As shown in FIG. 9A and FIG. 9B, similarly to Embodiment 1, when the temperature changes from low to high the warping of sheet A is increased in the image light source-side convex direction, and the warping of sheet B is increased in the viewing-side convex direction.

Thus in Embodiment 2 also, similarly to Embodiment 1, the thicknesses of the two sheets A and B are different by approximately a factor of 2, the elasticities differ between layers by at most a factor of 2, and the linear expansion rates between layers are also different. However, because the directions in which the two sheets press due to warping are opposite and the forces are substantially equal, the warping for the sheets overall when stacked is zero in the temperature range from −10° C. to 50° C.

Embodiment 3

In Embodiment 3, the sheet A differed from that in Embodiments 1 and 2 in being a lenticular lens sheet obtained by using an extremely thin adhesive layer to laminate the polyethylene terephthalate (PET) sheet face of a PET sheet, on one face of which is formed a lenticular lens using a urethane-system ultraviolet-curing resin, to a front plate formed by separate extrusion molding of an MS system resin. In Embodiment 3, the lenticular lens layer of sheet A formed using the urethane-system ultraviolet-curing resin was extremely thin, and with comparatively small elasticity ratio, so it was neglected. The initial-state warping of sheet A at 20° C. was 11.1 mm.

Sheet B differed from that of Embodiment 1 in being a fresnel sheet comprising an ultraviolet-curing resin lens layer on the incidence face-side, and was −2.1 mm at 20° C.

In Embodiment 3, similarly to Embodiments 1 and 2, the front plate-side of sheet A was positioned on the viewing side, but differing from Embodiments 1 and 2, the fresnel lens face of sheet B was positioned on the display apparatus light source side.

The table in FIG. 8 shows details of the layer configurations, materials, and physical properties of each of the sheets A and B. And, FIG. 9A and FIG. 9B show examples of calculations for temperature changes of the sheet A and the sheet B in the range −10° C. to 50° C.

As shown in FIG. 9A and FIG. 9B, in contrast with Embodiments 1 and 2, when the temperature changes from low to high the warping of sheet A changes from the image light source-side convex direction to become flat. On the other hand, the warping of sheet B changes from the viewing-side convex direction to become flat.

In this way, in Embodiment 3 the thicknesses of the two sheets differ by a factor of approximately 1.8, the linear expansion rates of the layers are also different by a maximum factor of approximately 2.7, and the elasticities of the layers are also different. However, because for the sheets overall the two sheets press together due to warping in opposite directions and the forces are substantially equal, so that when stacked together, the warping state is substantially zero in the temperature range from −10° C. to 50° C.

Embodiment 4

In Embodiment 4, sheet A was a lenticular lens sheet employing a configuration similar to that of Embodiment 1, but with different material composition and layer thicknesses; the initial-stage warping at 20° C. was 12.5 mm.

Sheet B was obtained by laminating a PET sheet using an extremely thin adhesive layer onto the other face of the MS-system resin base plate of a fresnel lens sheet with a configuration similar to that in Embodiment 1 but with different material composition and layer thicknesses. The warping of sheet B at 20° C. was −21.5 mm. In Embodiment 4, the fresnel lens layer of sheet B, formed using a urethane-system ultraviolet-curing resin, was extremely thin and had comparatively small elasticity ratio, and so was neglected.

The table in FIG. 8 shows details of the layer configurations, materials, and physical properties of each of the sheets A and B. And, FIG. 9A and FIG. 9B show examples of calculations for temperature changes of the sheet A and the sheet B in the range −10° C. to 50° C.

As shown in FIG. 9A and FIG. 9B, similarly to Embodiment 1, when the temperature changes from low to high the warping of sheet A changes greatly in the image light source-side convex direction, and the warping of sheet B changes greatly in the viewing-side convex direction. In this way, In this way, in Embodiment 4 the thicknesses of the two sheets differ greatly, the linear expansion rates of the different layers also differ by up to a factor of approximately 2.7, and the elasticities among layers also differ by up to a factor of 1.7. However, because for the sheets overall the directions in which the two sheets press due to warping are opposite and the magnitudes are substantially equal, when stacked, the warping is substantially zero in the temperature range −10° C. to 50° C.

As explained above using Embodiments 1 through 4, in laminated sheet of this invention, sheets the warping of which changes with temperature changes are comprised, so that, while having a configuration which entails an apparent imbalance in thicknesses and material properties, warping of the sheets overall can be suppressed.

Below, Embodiments 5 through 7 are explained. In Embodiments 5 and 6, in contrast with Embodiments 1 through 4, a diffuser plate and lens sheet for a backlight are laminated. Sheet A is positioned on the emission side (on the side of the liquid crystal panel), and sheet B is positioned on the incidence side (the backlight side). In Embodiment 7, in contrast with Embodiments 1 through 6, three sheets are stacked. Sheet C, sheet B, and sheet A are positioned in this order from the incidence side to the emission side.

FIG. 10 shows conditions for each of the sheets in Embodiments 5 through 7. The 2P lens layer appearing in FIG. 10 means an ultraviolet-curing resin lens layer. Similarly, the 2P prism layer is an ultraviolet-curing resin prism layer. The first layer is on the emission side, and the second layer is on the incidence side.

FIG. 11A and FIG. 11B show simulation results indicating the changes in the warping characteristics for each sheet in Embodiments 5 through 7, for temperature changes in the range −10° C. to 50° C. Units in FIG. 11A are mm. When numeric values in FIG. 11B indicating amounts of warping are positive (+), the warping of the sheet is in an incidence-side (backlight-side) convex shape. When numeric values in FIG. 11B indicating amounts of warping are negative (−), warping of the sheet is in an emission-side (liquid crystal panel-side) convex shape. The combined warping amount of the two sheets was calculated based on equation (26) below. The combined warping amount for three sheets was calculated based on equation (27) below.

[E 23]

$$\delta_{AB} = \frac{(E_A t_A^3 \delta_A + E_B t_B^3 \delta_B)}{(E_A t_A^3 + E_B t_B^3)} \quad (26)$$

[E 24]

$$\delta_{ABC} = \frac{(E_A t_A^3 \delta_A + E_B t_B^3 \delta_B + E_C t_C^3 \delta_C)}{(E_A t_A^3 + E_B t_B^3 + E_C t_C^3)} \quad (27)$$

Embodiment 5

In Embodiment 5, sheet A is a prism sheet. Sheet A is formed by forming a prism layer (a layer comprising urethane-system ultraviolet-curing resin) on PET (polyethylene terephthalate) film. The initial-state warping of sheet A at 20° C. was 286 mm.

Sheet B is a diffuser plate. Sheet B has an MS-system resin base plate, and on top of this base plate are formed lenticular lenses (a layer comprising urethane-system ultraviolet-curing resin). The initial-state warping of sheet B at 20° C. was −1.6 mm.

These sheets are stacked with the above-described sheet A on the emission side, and the above-described sheet B on the incidence side.

As shown in FIG. 11A and FIG. 11B, when the surrounding temperature (ambient temperature) changes from low to high, sheet A changes from a state of convex warping on the incidence side to a flat state. On the other hand, sheet B changes from a state of convex warping on the emission side to a flat state.

As shown in FIG. 10, in Embodiment 5 the thickness of sheet A is 5 or more times greater than that of sheet B. And, the elasticities of the layers comprised by each sheet are also different. The linear expansion rates of the layers of each sheet also differ by factors of up to 3 or more. Even though there is such imbalance in the conditions of the sheets, in the ambient temperature range from −10° C. to 50° C., no warping sufficiently great to pose problems occurs overall for the laminated sheets A and B. This is because at a prescribed temperature in the ambient temperature range from −10° C. to 50° C., the forces occurring in sheet A and pressing against sheet B, and the force occurring in sheet B and pressing against sheet A, are set so as to be effectively equal. In this way, in the ambient temperature range from −10° C. to 50° C., the warping occurring in the laminated sheets A and B is close to 0 (zero), and an effectively flat sheet member can be manufactured.

Embodiment 6

In Embodiment 6, similarly to Embodiment 5, the sheet A is a prism sheet. Sheet A is formed by forming a prism layer (a layer comprising a urethane-system ultraviolet-curing resin) on a PET (polyethylene terephthalate) film. The initial-state warping of sheet A at 20° C. was 216 mm.

Sheet B is a lens sheet. Sheet B has a PET film, and formed on this PET film, lenticular lenses (a layer comprising a urethane-system ultraviolet-curing resin (but of material different from that of the prism layer of sheet A)). The initial-stage warping of sheet B at 20° C. was −495 mm. The sheets were stacked with the above-described sheet A on the emission side and the above-described sheet B on the incidence side.

As shown in FIG. 11A and FIG. 11B, when the surrounding temperature (ambient temperature) changes from low to high, sheet A changes from a state of convex warping on the incidence side to a flat state. On the other hand, sheet B changes from a state of convex warping on the emission side to a flat state.

As shown in FIG. 10, in Embodiment 6 the thickness of sheet B is 1.2 times or more that of sheet A. And, the elasticities of the layers comprised by each of the sheets also differ by up to a factor of 1.8 or greater. And, the linear expansion rates of layers comprised by each sheet are different by up to a factor of 5 or greater. Even though there is such imbalance in the design of each of these sheets, over the surrounding temperature range of −10° C. to 50° C., warping sufficient to cause problems does not occur in the overall laminated sheets A and B. This is because when the surrounding temperature is at a prescribed temperature in the range −10° C. to 50° C., the force occurring in sheet A and pressing against sheet B, and the force occurring in sheet B and pressing against sheet A, are set so as to be effectively equal. In this way, in the ambient temperature range from −10° C. to 50° C., the warping occurring in the laminated sheets A and B is close to 0 (zero), and an effectively flat sheet member can be manufactured.

Embodiment 7

Sheets A and B are prism sheets. Sheets A and B are formed by forming prism layers (layers comprising urethane-system ultraviolet-curing resins) on a PET (polyethylene terephthalate) film. The prism layer of sheet A and the prism layer of sheet B comprise different materials. The initial-state warping at 20° C. of sheet A was 197 mm, and the initial-stage warping at 20° C. of sheet B was 87 mm.

Sheet C is a diffuser plate. Sheet C has a PET film, and formed on this PET film, lenticular lenses (a layer comprising a urethane-system ultraviolet-curing resin (but of material different from those of the prism layers of sheets A and B)). The initial-stage warping of sheet C at 20° C. was −10.4 mm. The above-described sheets A through C were stacked.

As shown in FIG. 11A and FIG. 11B, when the surrounding temperature (ambient temperature) changes from low to high, sheets A and B change from a state of convex warping on the incidence side to a flat state. On the other hand, sheet C changes from a state of convex warping on the emission side to a flat state.

As shown in FIG. 10, in this Embodiment 7 the thicknesses of sheets A, B and C are not uniform, and in particular the thickness of sheet C is greater than that of sheet B by a factor of 3.5 times or greater. Also, the elasticities of the layers comprised by each of the sheets differ by a factor of up to 1.8 times or more. And, the linear expansion rates of the layers comprised by each of the sheets differ by a factor of up to 3.5 or greater. Even though there is such imbalance in the design of each of these sheets, over the surrounding temperature range of −10° C. to 50° C., warping sufficient to cause problems does not occur in the overall laminated sheets A through C. This is because when the surrounding temperature is at a prescribed temperature in the range −10° C. to 50° C., the forces occurring in sheets A and B and pressing against sheet C, and the force occurring in sheet C and pressing against sheets A and B, are set so as to be effectively equal. In this way, in the ambient temperature range from −10° C. to 50° C., the warping occurring in the laminated sheets A through C is close to 0 (zero), and an effectively flat sheet member can be manufactured.

INDUSTRIAL APPLICABILITY

This invention can be used in laminated sheets and in display screens.

The invention claimed is:

1. A laminated sheet, in which a plurality of screen sheets are stacked, the laminated sheet comprising:
   a multilayer sheet A including two or more layers with different linear expansion coefficients; and
   a single sheet B which is a sheet other than the multilayer sheet A, wherein
   at least in a temperature range from 10° C. to 30° C., expressions (*1), (*2) and (*3) are satisfied, and, when all sheets are stacked, either (i) or (ii) below applies:

[E 1]

$|\Delta\theta_A| > 0$ (*1)

$-2 \leq \delta_{AB} \leq 10$ mm (*2)

$\delta_{AB} = \dfrac{E_A t_A^3 \delta_A + E_B t_B^3 \delta_B}{E_A t_A^3 + E_B t_B^3}$ (*3)

where
   (i) a viewing-side sheet is convex on an image light source side, and an image light source-side sheet is convex on the viewing side, and
   (ii) the viewing-side sheet and the image light source side-sheet are both convex on the image light source side, and a curvature of the viewing-side sheet is greater than a curvature of the image light source-side sheet,
   where,
   $\Delta\theta_A$: a rate of change in a warping $\delta_A$ of the multilayer sheet A due to changes in the temperature (mm/° C.),
   $\delta_{AB}$: a warping of the entirety of the sheets when all sheets are stacked, and the four corners thereof are fixed without a frame (mm: positive figures are the convex direction on the image light source side),
   $\delta_A$: a warping of the multilayer sheet A (mm: positive figures are the convex direction on the image light source side),
   $\delta_B$: a warping of the sheet B (mm: positive figures are the convex direction on the image light source side),
   $E_A$: Young's modulus of the multilayer sheet A (Pa),
   $E_B$: Young's modulus of the sheet B (Pa),
   $t_A$: a thickness of the multilayer sheet A (mm), and
   $t_B$: a thickness of the sheet B (mm).

2. The laminated sheet according to claim 1, wherein the multilayer sheet A is a lenticular lens sheet, and the sheet B is a fresnel lens sheet.

3. A laminated sheet, in which a plurality of screen sheets are stacked, the laminated sheet comprising:
   a multilayer sheet A including two or more layers with different linear expansion coefficients; and
   a multilayer sheet B which is a sheet other than the multilayer sheet A, and including two or more layers with different thermal expansion coefficients, wherein
   at least in a temperature range from 10° C. to 30° C., expressions (*4), (*5), (*6) and (*7) are satisfied, and, when all sheets are stacked, either (i) or (ii) below applies:

[E 2]

$|\Delta\theta_A| > 0$ (*4)

$|\Delta\theta_B| > 0$ (*5)

$-2 \leq \delta_{AB} \leq 10$ mm (*6)

$\delta_{AB} = \dfrac{E_A t_A^3 \delta_A + E_B t_B^3 \delta_B}{E_A t_A^3 + E_B t_B^3}$ (*7)

where
   (i) a viewing-side sheet is convex on an image light source side, and an image light source-side sheet is convex on the viewing side, and
   (ii) the viewing-side sheet and the image light source side-sheet are both convex on the image light source side, and a curvature of the viewing-side sheet is greater than a curvature of the image light source-side sheet,
   where,
   $\Delta\theta_A$: a rate of change in a warping $\delta_A$ of the multilayer sheet A due to changes in the temperature (mm/° C.),
   $\Delta\theta_B$: a rate of change in a warping $\delta_B$ of the multilayer sheet B due to changes in the temperature changes (mm/° C.),
   $\delta_{AB}$: a warping of the entirety of the sheets when all sheets are stacked, and the four corners thereof are fixed without a frame (mm: positive figures are the convex direction on the image light source side),
   $\delta_A$: a warping of the multilayer sheet A (mm: positive figures are the convex direction on the image light source side),
   $\delta_B$: a warping of the multilayer sheet B (mm: positive figures are the convex direction on the image light source side),
   $E_A$: Young's modulus of the multilayer sheet A (Pa),
   $E_B$: Young's modulus of the multilayer sheet B (Pa),
   $t_A$: a thickness of the multilayer sheet A (mm), and
   $t_B$: a thickness of the multilayer sheet B (mm).

4. The laminated sheet according to claim 3, wherein the multilayer sheet A is a lenticular lens sheet, and the multilayer sheet B is a fresnel lens sheet.

5. A display screen, comprising the laminated sheet according to claim 1.

* * * * *